United States Patent [19]

Deusing et al.

[11] 3,926,106

[45] Dec. 16, 1975

[54] FOOD-TREATMENT APPARATUS WITH CIRCULATED HOT COMBUSTION GAS

[75] Inventors: Erich Deusing, Herbornseelbach; Helmut Bernhardt, Weidenhausen; Wilfried Durth, Burbach-Wahlbach, all of Germany

[73] Assignee: Burger Eisenwerke Aktiengesellschaft, Herborn, Germany

[22] Filed: June 11, 1973

[21] Appl. No.: 368,692

[30] Foreign Application Priority Data

June 15, 1972 Germany............................ 7222344

[52] U.S. Cl. .................. 99/447; 99/474; 126/21 A
[51] Int. Cl.² ...................... A47J 37/06; F24C 15/32
[58] Field of Search ............. 99/447, 389, 401, 433, 99/446, 474; 126/21–22, 273, 376

[56] References Cited

UNITED STATES PATENTS

| | | | |
|---|---|---|---|
| 2,573,719 | 11/1951 | Lebherz............................ | 99/447 X |
| 2,906,620 | 9/1959 | Jung................................ | 126/21 A X |
| 3,324,844 | 6/1967 | Huffman......................... | 126/21 A X |
| 3,710,775 | 1/1973 | Tamada et al..................... | 126/21 A |
| 3,719,180 | 3/1973 | Pere................................. | 126/21 A |
| 3,780,721 | 12/1973 | Durth............................... | 126/21 A |

FOREIGN PATENTS OR APPLICATIONS 1,183,204    3/1970    United Kingdom............... 126/21 A

*Primary Examiner*—Edward L. Roberts
*Assistant Examiner*—Arthur O. Henderson
*Attorney, Agent, or Firm*—Karl F. Ross; Herbert Dubno

[57] ABSTRACT

A fuel gas is combusted in a gas burner arranged under a blower of the apparatus in a chamber separated from the food-treatment chamber by the rear wall thereof. The resulting hot gas is led into the closed food-treatment chamber of the apparatus via an opening communicating between the burner chamber and the food-treatment chamber directly below the blower intake, is drawn by the blower into the blower chamber, and is forced back into the food-treatment chamber through distribution holes in guide plates arranged parallel to but spaced from the walls of the food-treatment chamber. The blower chamber is also separated by the aforementioned rear wall from the food-treatment chamber but is separated from the burner chamber by a heat conductive wall with heat exchanging ribs on the blower chamber side thereof. The latter wall or partition is inclined upwardly toward the front of the oven.

5 Claims, 6 Drawing Figures

FOOD-TREATMENT APPARATUS WITH CIRCULATED HOT COMBUSTION GAS

1. CROSS-REFERENCE TO RELATED APPLICATIONS

This application is related to commonly assigned copending applications Ser. Nos. 247,160 now U.S. Pat. No. 3,780,721 and 343,537 filed Apr. 24, 1972 and Mar. 21, 1973, respectively.

2. FIELD OF THE INVENTION

The present invention relates to a food-treatment apparatus, and more particularly, to an oven, for the baking or roasting of foodstuffs and/or for the thawing of frozen foods, having a blower for internal forced circulation of hot combustion gas and air heated by combustion of a fuel within the oven.

3. BACKGROUND OF THE INVENTION

It is known in the art of heat-treatment of foodstuffs, i.e., the baking, roasting or other cooking of comestibles or the thawing of frozen foods, to provide a burner directly within a food-treatment chamber for producing a hot combustion gas from a gas burner which is circulated into direct contact with the foodstuff. The degree of effectiveness of such a treatment of the foodstuff is high. However, a gas-burner arrangement within the food-treatment chamber occupies space which could be available for treatment of foodstuffs and renders the gas burners inaccessible for repair or replacement. In addition, the gas burner may become contaminated with food residues.

Another problem is the difficulty of heating the foodstuff uniformly, especially when the food-treatment chamber of the apparatus is large, and particularly when it is high. Turbulence and air pockets easily lead to local gas stagnation and resulting local overheating or underheating of the foodstuffs.

4. OBJECTS OF THE INVENTION

It is an object of the present invention to provide an improved food-treatment apparatus of the above-described general type.

Another object is the provision of an apparatus for the aforedescribed purposes which is of a simple and compact construction of such an apparatus.

Still another object is the provision of means for an even and uniform heating of the foodstuffs in the closed chamber of a forced-circulation oven, regardless of where the foodstuff is positioned in the chamber.

5. SUMMARY OF THE INVENTION

We attain these objects by providing a food-treatment apparatus which comprises a closed food-treatment chamber adapted to receive foodstuffs. The apparatus, like the apparatus described in the aforementioned copending applications, has a circulating chamber adjacent the closed food-treatment chamber and separated therefrom by the rear wall of the latter chamber and a circulating means, e.g., a blower, in the circulating chamber for displacing hot combustion gas along a circulation path through the food-treatment chamber and the circulating chamber and past the foodstuff received in the food-treatment chamber. The latter may be formed with gas guides, baffles or partitions which are perforated or slotted so that the blower outflow is guided along the top and side walls of the food-treatment chamber and is admitted into the food-receiving space uniformly along these walls.

The apparatus according to the invention also includes a gas-burner chamber positioned under the circulating chamber and at least one gas burner in the gas-burner chamber, the burner chamber being separated from the food-treatment chamber by the rear wall of the latter. An upper portion of the burner chamber has an opening in this rear wall, directly below the blower-intake opening in the latter, which leads to the closed food-treatment chamber. Hot combustion gas from the burner chamber is introduced through this opening into the food-treatment chamber, so that such gas can be drawn into the circulating chamber by the circulating means or blower through the intake opening in the rear wall directly above the burner-chamber outlet slot and is forced by the blower to return to the food-treatment chamber by means of a guide system.

According to a preferred feature of our invention, the gas-burner chamber and the circulating chamber can have a common heat-conductive (metal) wall or partition, this wall being inclined upwardly towards the closed food-treatment chamber and the front of the oven.

The common wall between the gas-burner chamber and the circulating chamber above the gas-burner chamber can be provided with heat-exchange means on the circulating chamber side thereof. Such means effect heat transfer from the gas-burner chamber to the circulating chamber through the common wall. Suitable heat-exchange means of this type are ribs, webs or fins.

According to another feature of our invention, the outlet for the hot combustion gas is provided at the upper portion of the burner chamber and has the configuration of a slot extending along the major part of the width of the chamber. Combustion gas is thus introduced continuously into the closed food-treatment chamber for circulation, while the excess of circulated gas is released through a vent at the top of the circulation chamber. We found that the vent for the excess gas in an upper portion of the circulating chamber is particularly conducive to favorable circulation conditions through the circulating chamber and the closed food-treatment chamber.

According to another feature of the invention, several circulating chambers, arranged above each other, can be used. The circulating means or blowers, mounted therein cooperate in feeding the hot combustion gas along respective circulation paths and past the foodstuff disposed in the closed food-treatment chamber.

According to another feature of the invention, each additional circulating chamber can be provided with a heating chamber under it, which is connected with the upper portion of the gas-burner chamber by means of a conduit. Alternatively or in addition, each further circulating chamber can be provided with respective burner chambers and gas burners beneath the associated blower. Each additional burner chamber also has a slot-like opening which leads to the closed food-treatment chamber. It can also be provided with heat-exchange means on a common heat-conductive wall or partition between the same and the circulating chamber arranged thereabove.

The latter two embodiments of our invention lead to particularly satisfactory gas glow conditions and uniform and even heating of the foodstuff in the food-treatment chamber. Severe turbulence conditions, airpocket formation, flow stagnation and other flow conditions deleterious to an even and uniform distribution of the heat of the combustion gas to the foodstuff can be eliminated to a high degree. This is particularly true when the food-treatment chamber is large and/or high.

6. DESCRIPTION OF THE DRAWING

The above and other objects, features, and advantages will become more readily apparent from the following description, reference being made to the accompanying drawing in which.

7. SPECIFIC DESCRIPTION

Figure 1:
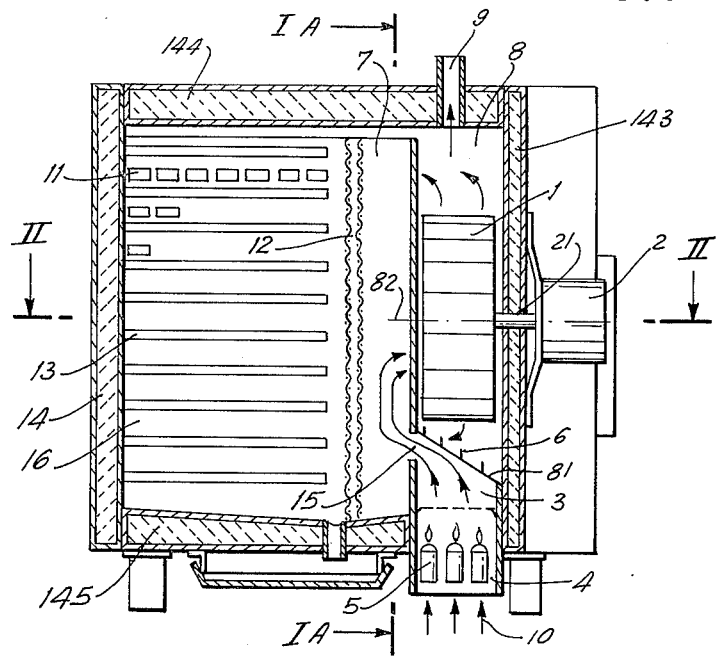
FIG. 1 is an axial, partly diagrammatic section through an apparatus according to the present invention.
Figure 2:
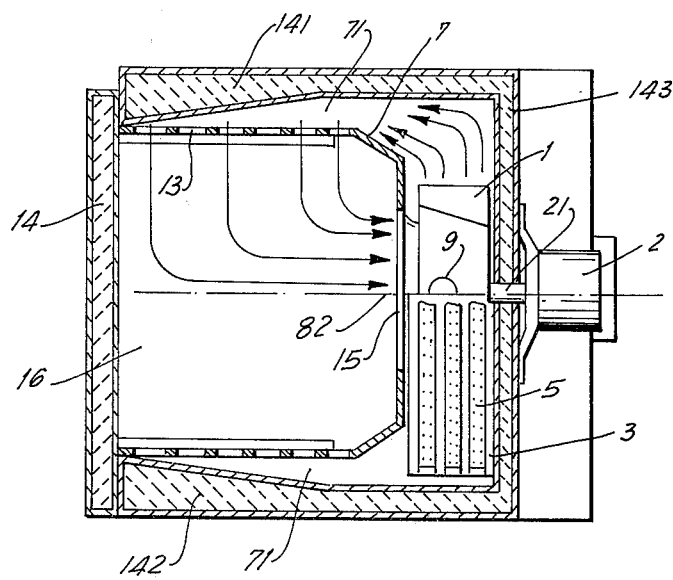
FIG. 2 is a section taken along line II—II of FIG. 1.
Figure 1A:
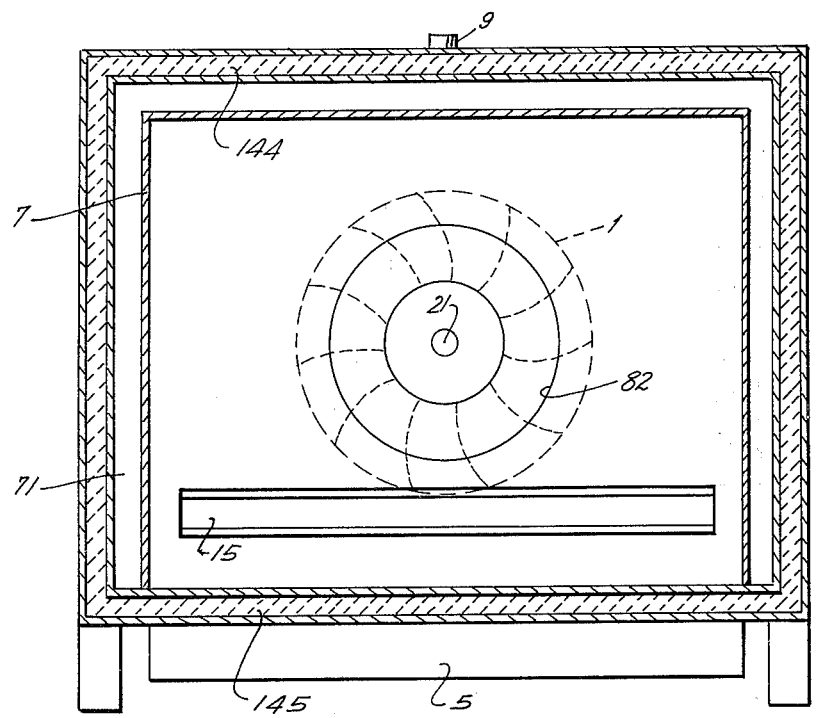
FIG. 1A is a section taken along line IA—IA of FIG. 1.

The apparatus according to the present invention and illustrated in FIGS. 1, 1A and 2 has a food-treatment chamber 16 bounded by door 14, lateral walls 141, 142, rear wall 143, top wall 144 and bottom 145. Guide plates 7 are placed along walls 141, 142, respectively leaving narrow spaces 71 between walls 141, 142 and guide plates 7, respectively. Guide plates 7 are provided with a multitude of distribution openings 11 for the circulated gas. They also have several horizontal bars 13 fastened thereto to carry food-receiving racks or similar devices (not shown). A fat filter 12 (see the aforementioned application) can be placed behind the racks and ahead of the blower intake, at a location at which guide plates 7 are bent towards the axis of the apparatus (FIG. 2).

A motor 2 is arranged on the outside of rear wall 143. Its shaft 21 is journaled in and extends through rear wall 143. A horizontal plane through this line is section II — II of FIG. 2. Shaft 21 of motor 2 carries blower 1 arranged in blower chamber 8, adjacent food-treatment chamber 16 and the bent portions of guide plates 7.

Blower chamber 8 is provided with an inlet 82 for hot combustion gas drawn from food-treatment chamber 16 and an outlet 9 for hot combustion gas in addition to the narrow channels 71 for return of circulated gas. It is also provided on its bottom 81 with heat-exchange ribs 6.

A gas-burner chamber 3 is provided under blower chamber 8. The two chambers are separated by the common heat-conductive wall 81, which can be inclined upwardly towards food-treatment chamber 16. A gas burner 5 is arranged in the lower portion of gas-burner chamber 3. This lower portion is also provided with air inlet 10. The upper portion of gas-burner chamber 3 adjacent food-treatment chamber 16 has an opening 15 leading to food-treatment chamber 16.

Figure 3A:
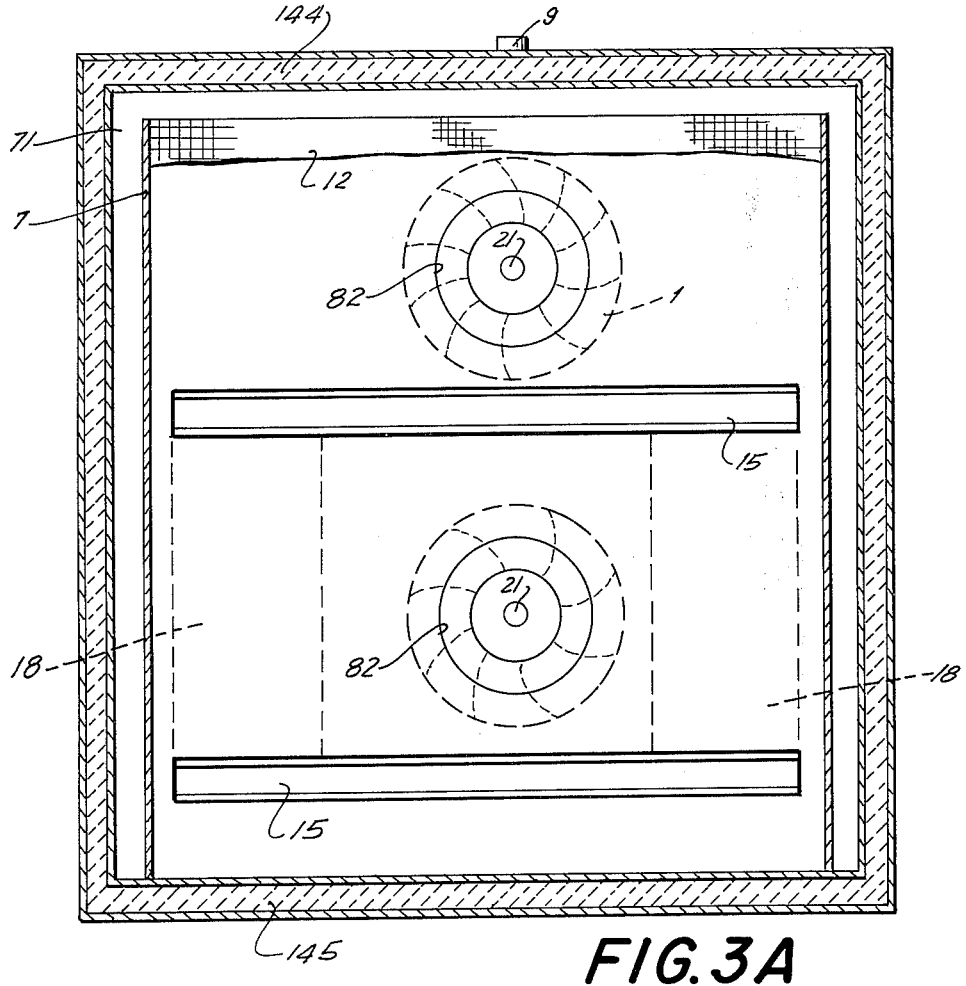
FIG. 3A is a section taken along line IIIA—IIIA of FIG. 3.
Figure 3:
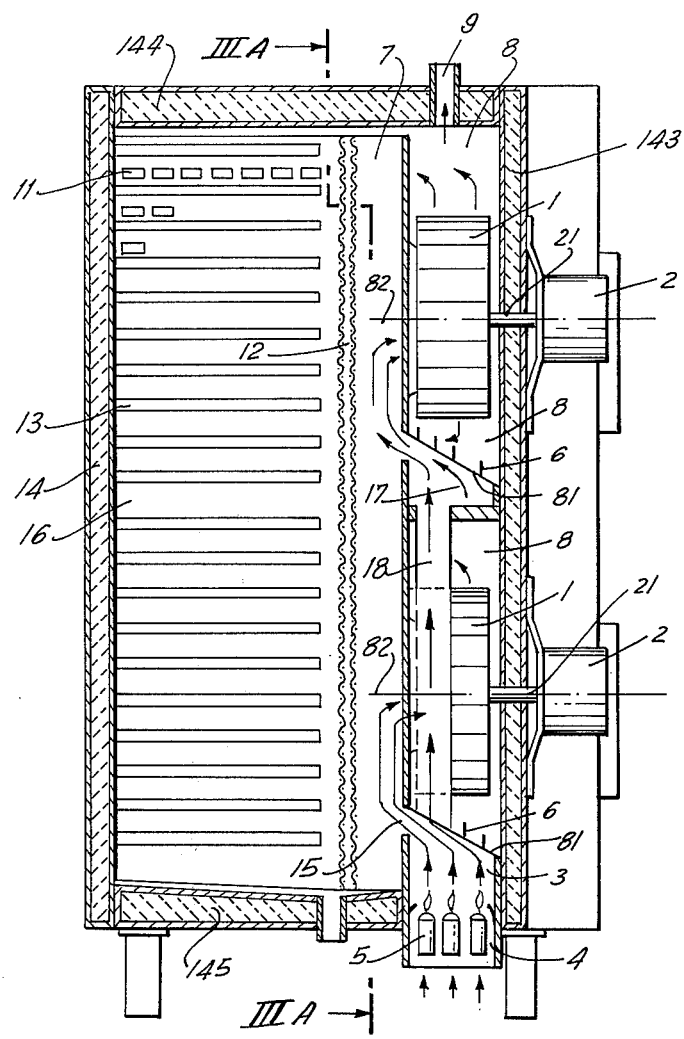
FIG. 3 is an axial partly diagrammatic, section through another embodiment of the apparatus according to the present invention.

FIGS. 3 and 3A show an embodiment of the apparatus of our invention which is provided with two blowers 1. A heating chamber 17 is arranged under the upper blower chamber 8. Heating chamber 17 is similar in shape to gas-burner chamber 3 but is not provided with a gas burner 5 and an air inlet 10. A conduit 18 is provided between gas-burner chamber 3 and heating chamber 17. Heating chamber 17 has an opening 15 leading to food-treatment chamber 16.

Figure 4:
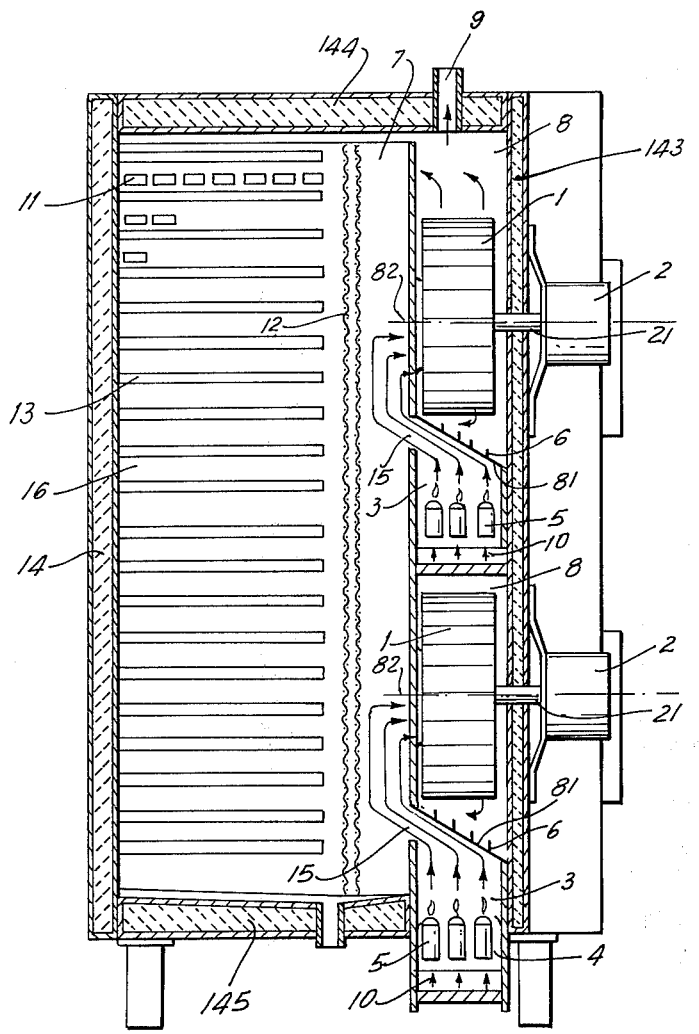
FIG. 4 is an axial section through still another embodiment of the apparatus, according to the present invention.

FIG. 4 shows another embodiment of the apparatus of our invention provided with two blowers 1. It is similar to the above-mentioned embodiment of FIG. 3 but an additional gas-burner chamber 3 with a gas burner 5 and an inlet 10 is provided under the upper blower chamber 8, and no conduit 18 connecting the two gas-burner chambers 3 is provided.

Foodstuff is placed on racks (not shown) suspended on bars 13. Door 14 is closed, gas burner 5 is ignited and the motor is started. Air is drawn in through air inlet 10. Hot combustion gas leaves opening 15, enters food-treatment chamber 16 and is drawn by blower 1 into blower chamber 8. It is injected by blower 1 into narrow channels 71. One portion of the ejected combustion gas leaves the apparatus through outlet or vent 9. This is necessary to prevent a pressure-buildup in the apparatus. The combustion gas in narrow channels 71 enters into food-treatment chamber 17 again through distribution openings 11 and is guided to pass and heat the foodstuff on the racks, and the circulation cycle of the hot combustion gas is completed.

Heat-exchange ribs 6 on common wall 81 in blower chamber 8 effect heat transfer from gas-burner chamber 3 to blower chamber 8 through common wall 81. This results in higher effectiveness and even and uniform circulation through blower chamber 8 and food-treatment chamber 16. The bent portions of guide plates 7 (FIG. 2) also contribute to improved circulation conditions in the food-treatment chamber 16.

Referring to FIG. 3, hot combustion gas enters into food-treatment chamber 16 through the lower opening 15 but it also enters heating chamber 17 (under the upper blower chamber 8) through conduit 18. Such an arrangement will assist in distributing the heat in the food-treatment chamber 16 more evenly and uniformly and preventing the foodstuff on racks in the lower portion of food-treatment chamber 16 from overheating and foodstuff on racks in the upper portion of food-treatment chamber 16 from underheating and generally improving the circulation conditions in the apparatus. The upper common wall 81 between heating chamber 17 and the upper blower chamber 8 is provided with heat-exchange ribs 6 in blower chamber 8 to effect heat transfer from heating chamber 17 to the upper blower chamber 8 through the upper common wall 81.

Finally, referring to FIG. 4, hot combustion gas produced by the lower and the upper gas burners 5 is introduced into food-treatment chamber 16 through the lower and upper openings 15, respectively. Such an arrangement will also assist in distributing the heat in the food-treatment chamber 16 more evenly and uniformly and preventing the foodstuff on racks in the lower portion of food-treatment chamber 16 from overheating and foodstuff on racks in the upper portion of food-treatment chamber 17 from underheating and generally improving the circulation conditions in the apparatus. The upper common wall 81 between the upper gas-burner chamber 3 and the upper blower chamber 8 is provided with heat-exchange ribs 6 in the upper blower chamber 8 to effect heat transfer from the upper gas-burner chamber 3 to the upper blower chamber 8 through the upper common wall 81.

We claim:
1. A food-treatment apparatus comprising:
a food-treatment chamber adapted to receive a foodstuff and having a rear wall;
a circulating chamber behind said wall adjacent said food-treatment chamber and communicating therewith through an inlet formed in said wall;
circulating means in said circulating chamber for displacing hot combustion gas along a circulation path through said chambers past said foodstuff;
a burner chamber behind said wall and directly beneath said circulating chamber;
a gas burner in said gas-burner chamber directly beneath said circulating chamber, said wall being formed with an opening communicating between said food-treatment chamber and said burner chamber at an upper portion of the latter for introducing hot combustion gas from said gas burner into said food-treatment chamber and for feeding hot combustion gas along said circulation path; and
a common heat-conductive partition between said gas-burner chamber and said circulating chamber, said partition being inclined upwardly towards said opening.

2. The apparatus defined in claim 1, further comprising heat-exchange means on said common wall in said circulating chamber for effecting heat transfer from said burner chamber to said circulating chamber through said partition.

3. The apparatus defined in claim 1, further comprising a vent for said hot combustion gas, provided in an upper portion of said circulating chamber.

4. The apparatus defined in claim 1, further comprising at least one additional circulating chamber behind said wall above the first-mentioned circulating chamber; an additional circulating means in said additional circulating chamber, for circulating said hot combustion gas; and a heating chamber provided under said additional circulating chamber behind said wall and communicating with said food treatment chamber through an opening provided in said wall.

5. The apparatus defined in claim 4, further comprising a conduit connecting said upper portion of said burner chamber and said heating chamber.

* * * * *